United States Patent
Lee et al.

(10) Patent No.: US 8,175,006 B2
(45) Date of Patent: May 8, 2012

(54) MULTI-PATH LOAD BALANCING USING ROUTE CONTROLLER

(75) Inventors: Seungjoon Lee, Springfield, NJ (US); Jacobus Van Der Merwe, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 336 days.

(21) Appl. No.: 12/653,039

(22) Filed: Dec. 8, 2009

(65) Prior Publication Data

US 2011/0134769 A1  Jun. 9, 2011

(51) Int. Cl.
 *H04L 12/28* (2006.01)
(52) U.S. Cl. ........................................ 370/254; 370/401
(58) Field of Classification Search .......... 370/254–255, 370/351–356, 389–391, 395.5–395.52, 400–401
See application file for complete search history.

(56) References Cited

U.S. PATENT DOCUMENTS 7,904,589 B2 *  3/2011  Van Der Merwe et al. ... 709/238

OTHER PUBLICATIONS

Verkaik et al, Wresting Control from BGP: Scalable Fine-grained Route Control, 2007 USENIX Annual Technical Conference, 14 pages, 2007.*
Van der Merwe et al, Dynamic Connectivity Management with an Intelligent Route Service Control Point, ACM, 6 pages, 2006.*

* cited by examiner

*Primary Examiner* — Frank Duong (57) ABSTRACT

Systems and methods are described that employ multi-path BGP to realize dynamic multi-path load balancing based on an Intelligent Route Service Control Point (IRSCP) router control architecture that uses dynamic traffic flow information to perform dynamic load balancing to enable precise and effective load balancing.

16 Claims, 7 Drawing Sheets

↓ minimizing the total cost of serving all the $S_i$ requests without violating server $i$ capacity as subject to  $\sum_{i,j} c_{ij} r_j x_{ij}$, $\sum_i x_{ij} = 1, \forall j$ and $\sum r_j x_{ij} \leq S_i, \forall i,j$, where $x_{ij} \in [0,1], \forall i,j$ — 711

↓ forwarding the optimal load balancing solution to an IRSCP — 713

↓ translating the minimized load solutions $x_{ij}$ into integers to preserve the ratios (proportion) and using them as synthetic bandwidth community values — 715

↓ attaching the set of synthetic bandwidth community values to BGP route advertisements when distributing BGP route information to other routers — 717

MULTI-PATH LOAD BALANCING USING ROUTE CONTROLLER

BACKGROUND OF THE INVENTION

The invention relates generally to network multi-path routing. More specifically, the invention relates to systems and methods that enables dynamic load balancing using multi-path Border Gateway Protocol (BGP) mechanisms. Standard (static) multi-path BGP mechanisms are combined with an Intelligent Route Service Control Point (IRSCP) architecture that uses dynamic load information and calculates an optimal load balancing proportion across multiple paths.

Today's Internet comprises multiple Autonomous Systems (ASs) and BGP is the de facto standard routing protocol to exchange routing information between ASs. A pair of neighboring ASs typically have multiple peering points where they exchange through BGP sessions BGP control messages that contain routing information. BGP peering sessions between different ASs are referred to as external BGP (eBGP) sessions. Within an AS, BGP is also used to exchange BGP learned routes between routers and are referred to as internal BGP (iBGP) sessions.

Figure 1:
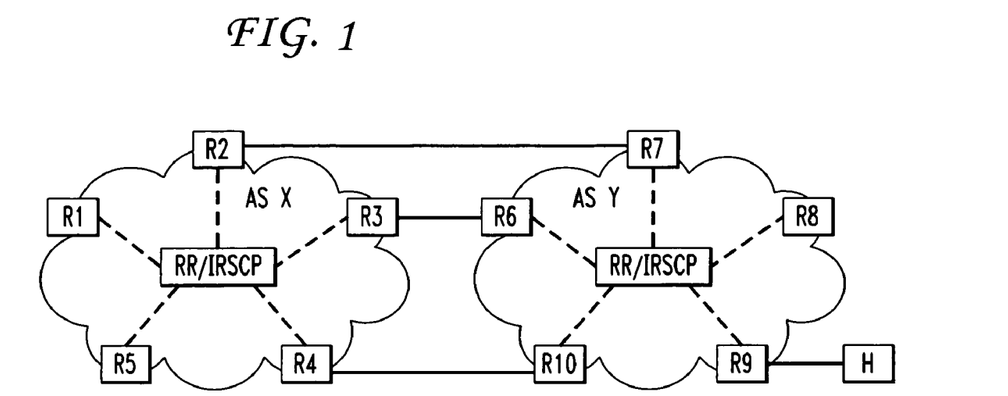
FIG. 1 is an exemplary ISP routing connectivity between two ASs with three peering points.

Multi-path routing is a routing technique that leverages multiple alternative paths through a network to yield a variety of benefits such as fault tolerance, increased bandwidth, or improved security. FIG. 1 shows five routers R1, R2, R3, R4 and R5 in AS X and five routers R6, R7, R8, R9 and R10 in AS Y. The two ASs use three routers as peering routers between the ASs, R2-R7, R3-R6 and R4-R10. The peering routers are configured with eBGP sessions between them for the exchange of routing information (solid lines). iBGP sessions are shown (broken lines) between the routers in AS X and AS Y and an AS specific iBGP route distribution entity. In traditional IP networks the route distribution entity is a Route Reflector (RR). An RR only distributes routes without applying any policies and/or modification. An alternative approach constitutes the use of a route distribution function that also applies policies and as a result may manipulate or change the routes it distributes. This approach is allowed by an Intelligent Route Service Control Point (IRSCP) architecture.

The IRSCP architecture allows a network operator to flexibly control routing between the traffic ingresses and egresses within an ISP's network without modifying the ISP's existing routers. The IRSCP subsumes the control plane of an ISP's network by replacing the distributed BGP decision process of each router in the network with a flexible, logically centralized application controlled route computation. The IRSCP supplements the traditional BGP decision process with an explicitly ranked decision process that allows route control applications to provide a per-destination, per-router explicit ranking of traffic egresses.

The IRSCP advertises an appropriate set of link bandwidth values (not necessarily the same as the actual static link bandwidth values) to routers. On receiving these routes from the IRSCP, the routers follow normal routing selection processes as dictated by protocol standards. However, because the link bandwidth values associated with these routes have been calculated as part of the IRSCP load balancing algorithm, the routers execute this load balancing decision by the IRSCP by just following the normal protocol processing without realizing what is happening behind the scene.

FIG. 1 shows if a host H or network is reachable through router R9. The prefix associated with the host H will be advertised to router R9 (typically using eBGP), and from router R9 the route will be distributed throughout AS Y. In turn, AS Y advertises the route to its BGP neighbors using BGP sessions of its peering routers. For example, router R2 will learn the route information from router R7, router R3 from router R6, and router R4 from router R10. Router R1 and all other routers in AS X will learn of the route to host H from all three peering routers R2, R3 and R4.

To select between these different options, ASs employ a policy known as hot potato routing whereby the route received from the nearest peering router is selected. If the distance or cost from router R1 to router R2, router R3 and router R4 is 1, 3 and 3 respectively, router R1's nearest exit is router R2, and a packet to host H uses the link between router R2 and router R7 to reach AS Y. After the packet reaches AS Y, all routing decisions are made by AS Y, and AS X has no control over how the packet is ultimately routed to reach host H.

Although BGP by default selects only one egress point for a given destination, routers may be configured so that multiple egress points may be used and perform load balancing. Using this multi-path BGP extension, all equal cost paths to a specific destination may be used to forward traffic to a destination. Further, traffic towards this destination may be load balanced according to the static link capacities of the peering links associated with the paths.

To configure BGP to distribute traffic proportionally over external links with unequal bandwidth when multi-path load balancing is enabled, the bgp dmzlink-bw command is used in the address family configuration mode. This command must be entered on each router that contains an external interface that is to be used for multi-path load balancing.

The bgp dmzlink-bw command is used to configure BGP to distribute traffic proportionally to the bandwidth of external links. This command is configured for multi-path load balancing between directly connected eBGP neighbors. This feature is used with BGP multi-path features to configure load balancing over links with unequal bandwidth. The neighbor dmzlink-bw command must also be configured for each external link through which multi-path load balancing is configured to advertise the link bandwidth as an extended community. The neighbor send-community command is configured to exchange the link bandwidth extended community with iBGP peers.

The neighbor dmzlink-bw command is used to configure BGP to advertise the bandwidth of the specified external interface as an extended community. This command is configured for links between directly connected eBGP neighbors. The link bandwidth extended community attribute is propagated to iBGP peers when extended community exchange is enabled with the neighbor send-community command. This feature is used with BGP multi-path features to configure load balancing over links with unequal bandwidth. This feature is not enabled until the bgp dmzlink-bw command is entered under the address family session for each router that has a directly connected external link.

Figure 2:
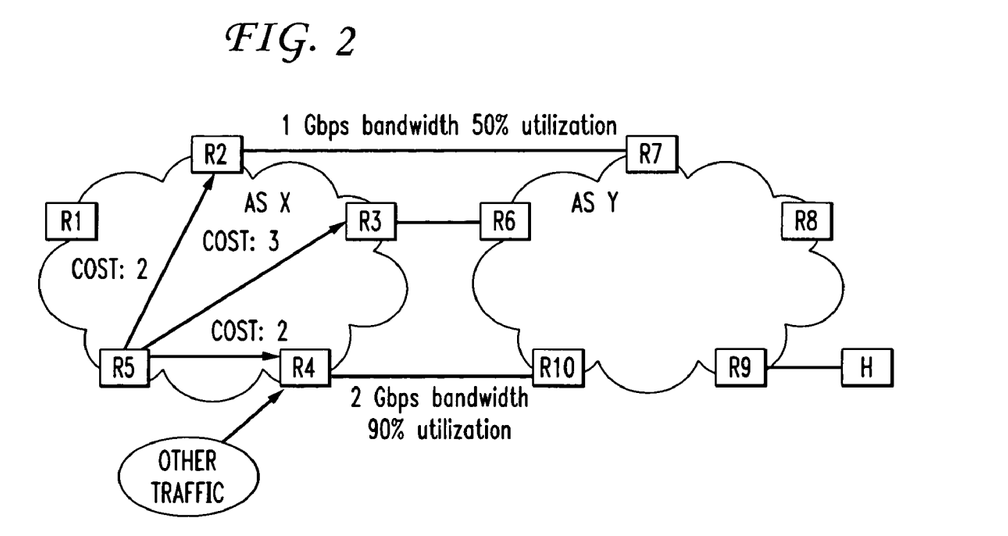
FIG. 2 is the exemplary ISP routing connectivity in FIG. 1 comparing link cost with link capacity.

For example, in FIG. 2 the distance from router R5 to routers R2, R3 and R4 is 2, 3, and 2, respectively. Because router R5 has the same cost or distance to routers R2 and R4, it may use both egress routers for traffic destined to host H using the multi-path BGP extension. However, it is possible that the peering links at routers R2 and R4 have different link capacity, for example, 1 Gbps and 2 Gbps. In this case, it would be desirable for router R4 to have two times as much traffic as router R2. To enable such differentiation, multi-path BGP defines an extended community value for the link bandwidth. Using this attribute, routers R2 and R4 respectively can inform R5 that their peering link capacity is 1 Gbps and 2 Gbps (i.e., these community values are included in the BGP routes for host H that routers R2 and R4 advertise in AS X).

Then, when router R5 selects an egress router to reach host H, it can load balance by sending ⅓ of its traffic to router R2 and ⅔ of its traffic to router R4.

Although multi-path BGP provides a mechanism to enable multi-path routing and load balancing, the value used for the load balancing decision is static and does not deal with dynamic load change. This limitation can lead to undesirable consequences.

EXAMPLE 1

FIG. 2 shows that although the link capacity at router R4 is higher than at router R2, it is possible that there are more routers in the vicinity of router R4 (denoted by other traffic) that are using router R4 as an egress point according to the hot potato principle. These routers might not be able to use other peering links for the traffic they are sending to AS Y, as would be the case if all other egress routers have a higher cost than router R4 (i.e., the other routers have no equal cost paths they can load balance between).

If the peering link at router R4 is 90% utilized (or 200 Mbps spare capacity out of 2 Gbps), and the link at router R2 is 50% utilized (or 500 Mbps spare capacity out of 1 Gbps) and that router R5 is starting to get additional traffic load of 450 Mbps. If load balancing is based on the static bandwidth value, then router R5 will send ⅔ of 450 Mbps (or 300 Mbps) to router R4 and the rest to router R2 which results in congestion at router R4. In this case, the current link utilization information must be considered to load balance the traffic from router R5, such that router R5 sends less than 200 Mbps to router R4 while sending the rest to router R2.

EXAMPLE 2

Figure 3:
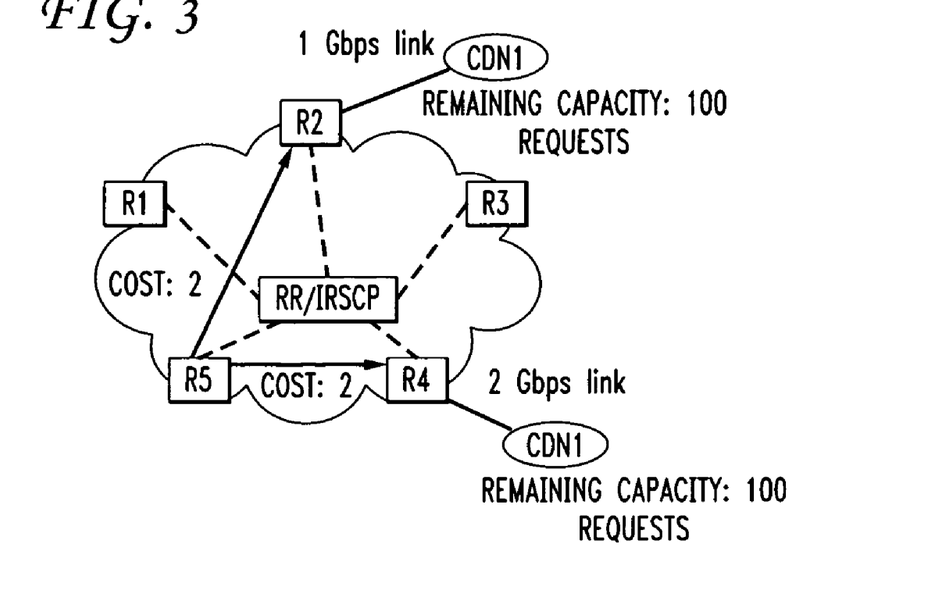
FIG. 3 is an exemplary network using external load information.

The use of static values in multi-path BGP also cannot handle the case where an external system determines the bottleneck load. FIG. 3 shows the case where another prefix G is advertised to routers R2 and R4 that in turn advertise it to AS X. In this case, however, prefix G is associated with an anycast address, and Content Distribution Network (CDN) servers (or CDN server complex) CDN1 and CDN2 are connected to routers R2 and R4 respectively. The link between router R4 and CDN2 has a higher link capacity than the corresponding link between router R2 and CDN1 and both CDN servers CDN1 and CDN2 have the same capacity. The CDN servers CDN1 and CDN2 each have spare capacity to serve 100 more web object requests. Because routers R2 and R4 are the same distance from router R5 and advertise the same prefix G, router R5 can use the static link capacities advertised with prefix G to perform load balancing between routers R2 and R4 as before.

However, if router R5 has 180 new requests, again, sending ⅔ (or 120 requests) of the requests to router R4 will overload CDN2. This example shows again that the use of static link capacity alone is not adequate for effective load balancing.

The above examples show that load balancing would benefit using dynamic load information when making a load balancing decision. To enable dynamic load balancing using the multi-path BGP mechanism, the IRSCP architecture is needed.

Figure 4:
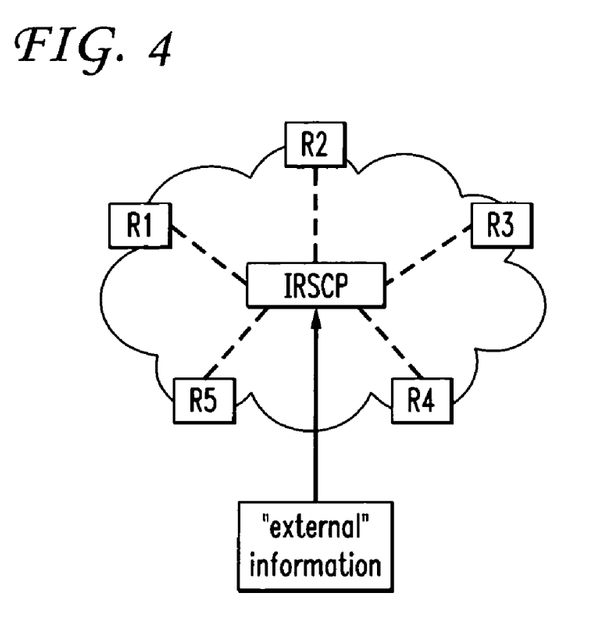
FIG. 4 is an exemplary IRSCP controlled network.

The IRSCP is an iBGP route distribution mechanism. However, FIG. 4 shows that an IRSCP can apply routing policies (in addition to simply distributing routes) and furthermore can use external information in determining how to apply such policies. The ability of an IRSCP to use external information in performing route selection is needed to overcome the limitations of static BGP multi-path load balancing.

What is desired are systems and methods that use dynamic load information and provide an optimal load balancing proportion across multiple paths.

SUMMARY OF THE INVENTION

The inventors have discovered that it would be desirable to have systems and methods that use standard (static) multi-path BGP mechanisms which are combined with an Intelligent Route Service Control Point (IRSCP) architecture and use dynamic load information to calculate an optimal load balancing proportion across multiple paths.

One aspect of the invention provides a method for network multi-path load balancing. Methods according to this aspect of the invention include for an Autonomous System (AS), acquiring IP traffic flow data for each of its ingress routers j, for each ingress router j, sending r requests ($r_j$) to an address G in another AS via anycast BGP, for each Content Distribution Network (CDN) server i in another AS, S requests ($S_i$) may be processed, if CDN server i serves a request entered from router j, a cost c is allocated ($c_{ij}$), defining $x_{ij}$ as the fraction of requests entering from router j that are served by server i, and minimizing the total cost of serving all the $S_i$ requests without violating server i capacity as $$\sum_{i,j} c_{ij} r_j x_{ij},$$

subject to constraints $$\sum_i x_{ij} = 1, \forall j$$

and $\Sigma r_j x_{ij} \leq S_i$, $\forall i,j$ as minimized load solutions $x_{ij}$ where $x_{ij} \in [0,1]$, $\forall i,j$.

Another aspect of the invention provides a route controller that adjusts route BGP bandwidth extended Community Values (CVs) according to an optimal splitting ratio. Route controllers according to this aspect of the invention include a processor and a storage device having embodied therein a program for execution by the processor, the program providing a multi-path load balancing framework configured to for an Autonomous System (AS), acquiring IP traffic flow data for each of its ingress routers j, for each ingress router j, sending r requests ($r_j$) to an address G in another AS via anycast BGP, for each Content Distribution Network (CDN) server i in another AS, S requests ($S_i$) may be processed, if CDN server i serves a request entered from router j, a cost c is allocated ($c_{ij}$), defining $x_{ij}$ as the fraction of requests entering from router j that are served by server i, and minimizing the total cost of serving all the $S_i$ requests without violating server i capacity as $$\sum_{i,j} c_{ij} r_j x_{ij},$$

subject to constraints $$\sum_i x_{ij} = 1, \forall j$$

and $\Sigma r_j x_{ij} \leq S_i$, $\forall i,j$ as minimized load solutions $x_{ij}$ where $x_{ij} \in [0,1]$, $\forall i,j$.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions configured to load balance two or more routes from a source router through multiple routers to a destination router that use standard (static) multi-path BGP mechanisms which are combined with an Intelligent Route Service Control Point (IRSCP) architecture and use dynamic load information to calculate an optimal load balancing proportion across multiple paths. Embodiments input relevant dynamic load information to an IRSCP. Examples of relevant dynamic flow data may include Simple Network Management Protocol (SNMP) data or NetFlow data to determine link use. In the case of external servers, server load may be input to an IRSCP.

Based on the best solution, the IRSCP calculates a set of bandwidth values that will realize the best solution load balancing, which is pushed to routers using iBGP sessions. Afterwards, all the routers will act on the bandwidth value calculated by the IRSCP, not the actual bandwidth value of the physical links. The method may be executed by a route controller such as an IRSCP or an NMS server. Components of the invention may be enabled as a modular framework and/or deployed as software as an application program tangibly embodied on a program storage device. The application code for execution can reside on a plurality of different types of computer readable media known to those skilled in the art.

Figure 5:
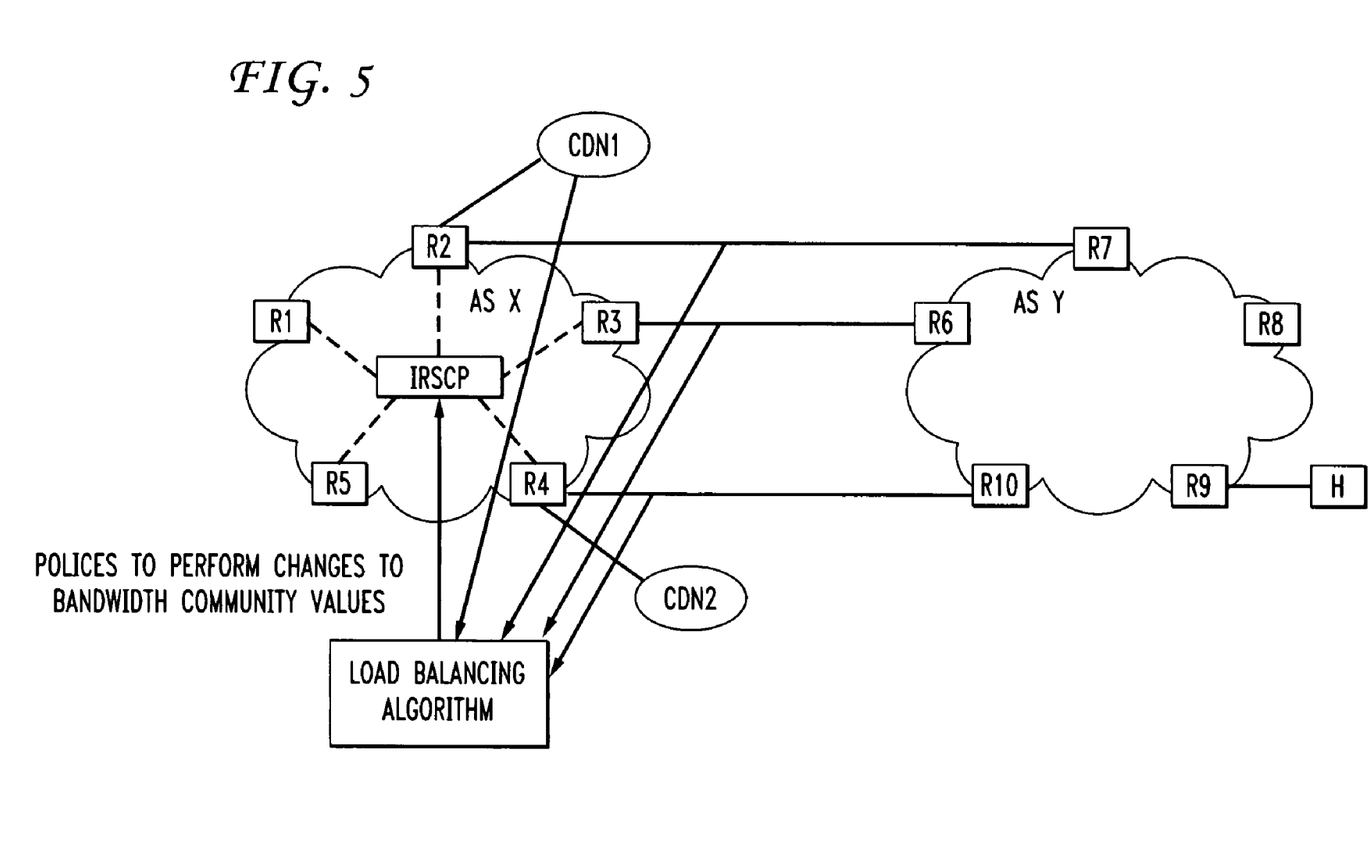
FIG. 5 is an exemplary IRSCP controlled network that uses external information from a system framework that provides optimal load balancing.

FIG. 5 shows a system framework (external entity—load balancing algorithm) that executes the load balancing method using dynamic load information such as link utilization and CDN server load. The output is translated into synthetic bandwidth community values. The IRSCP attaches the set of bandwidth values when it distributes BGP route information to other routers.

Figure 6:
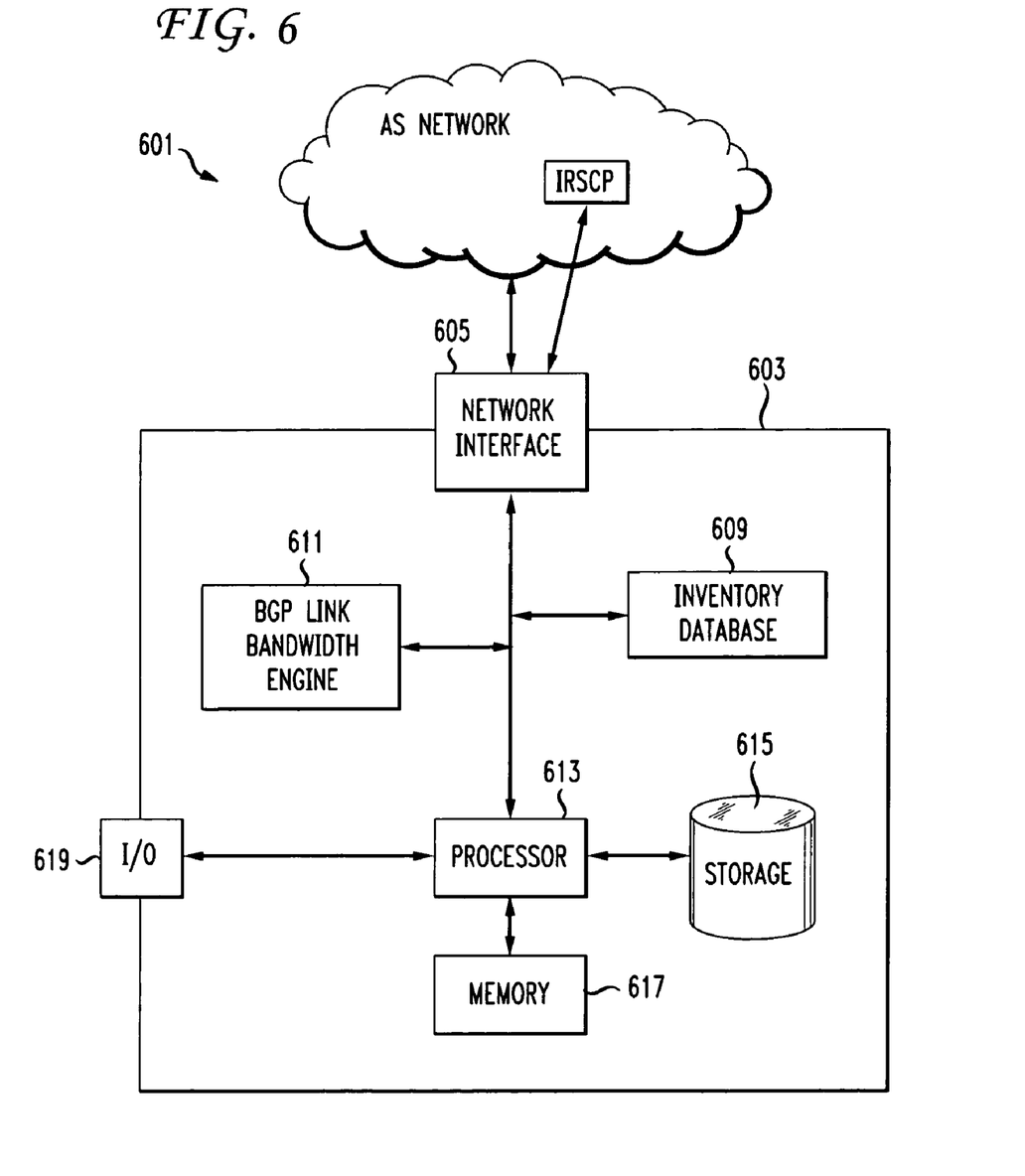
FIG. 6 is an exemplary system framework.
Figure 7:
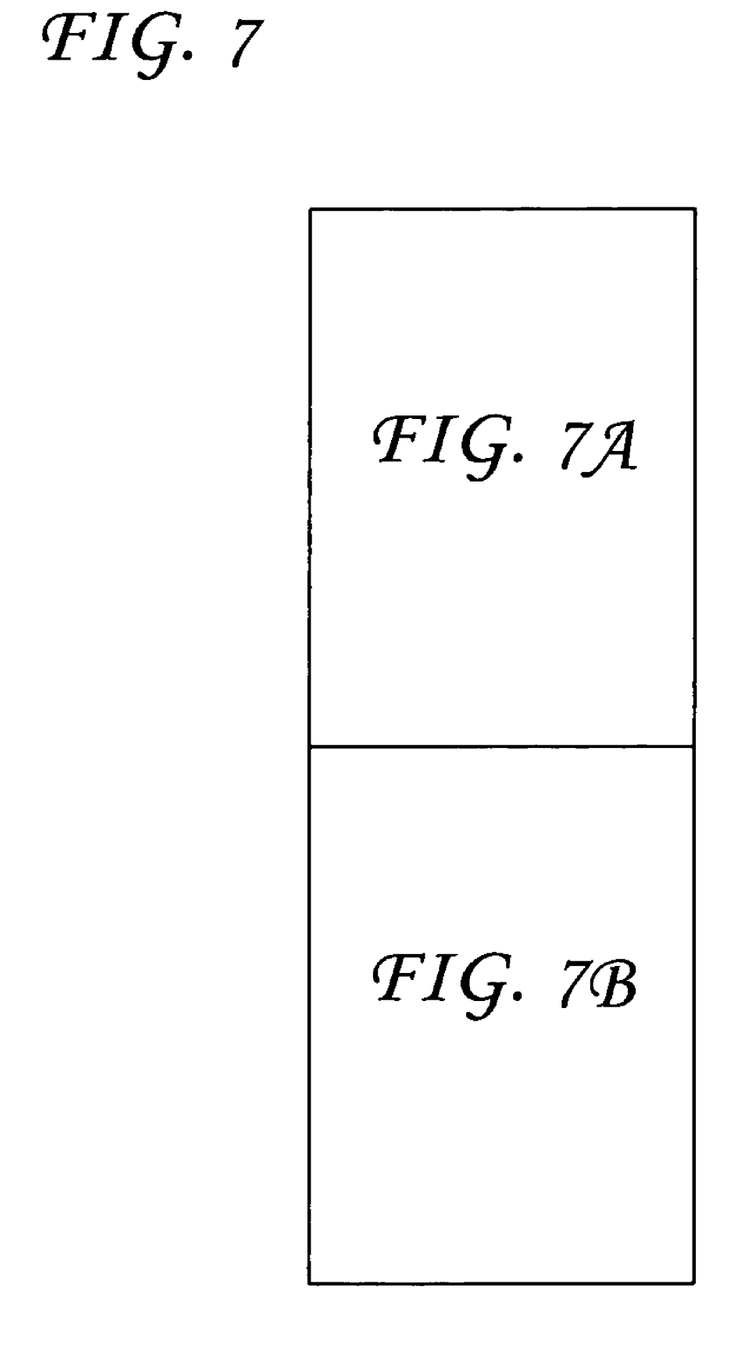
FIG. 7 is an exemplary method.
Figure 7A:
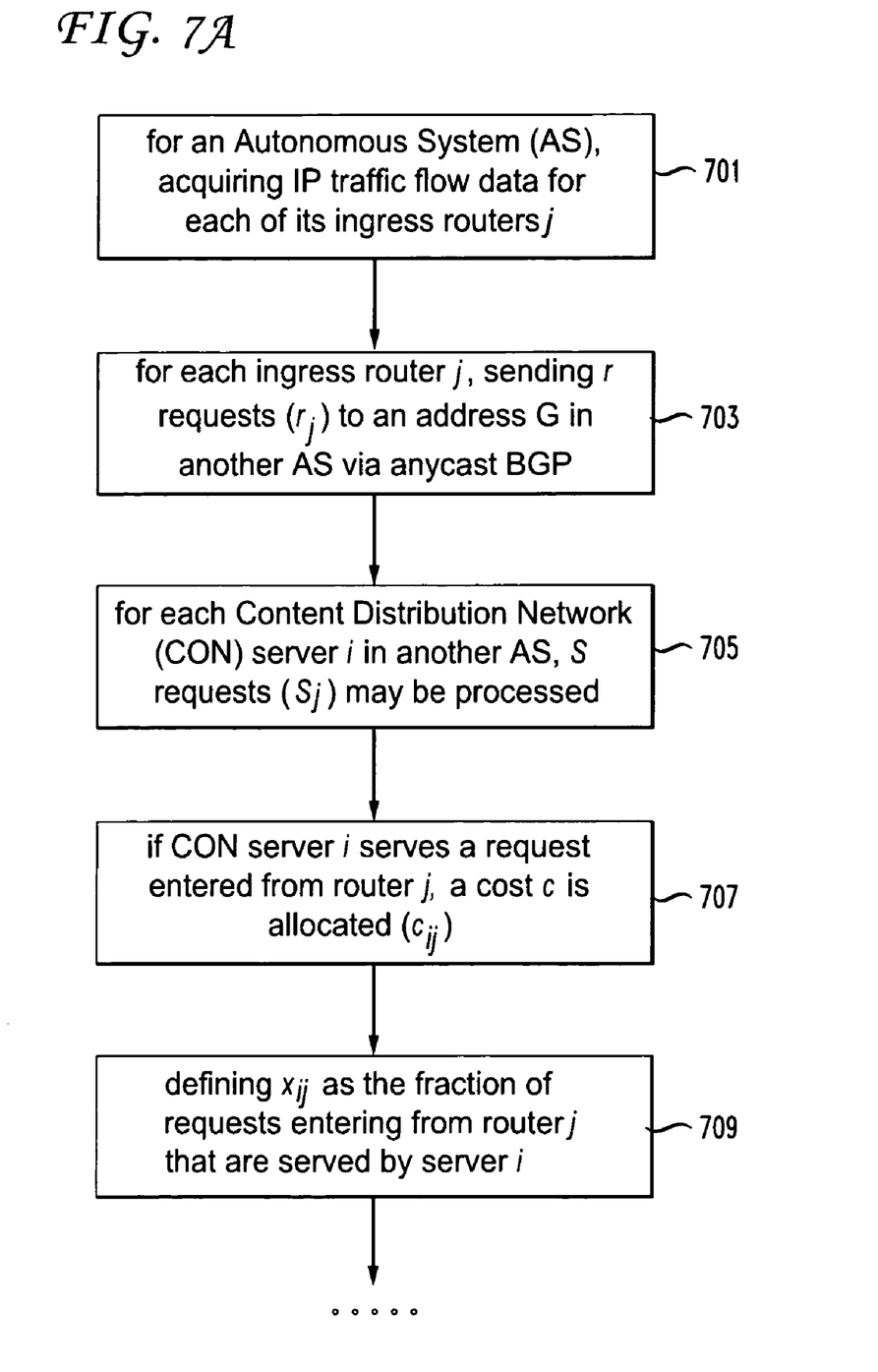
Figure 7B:
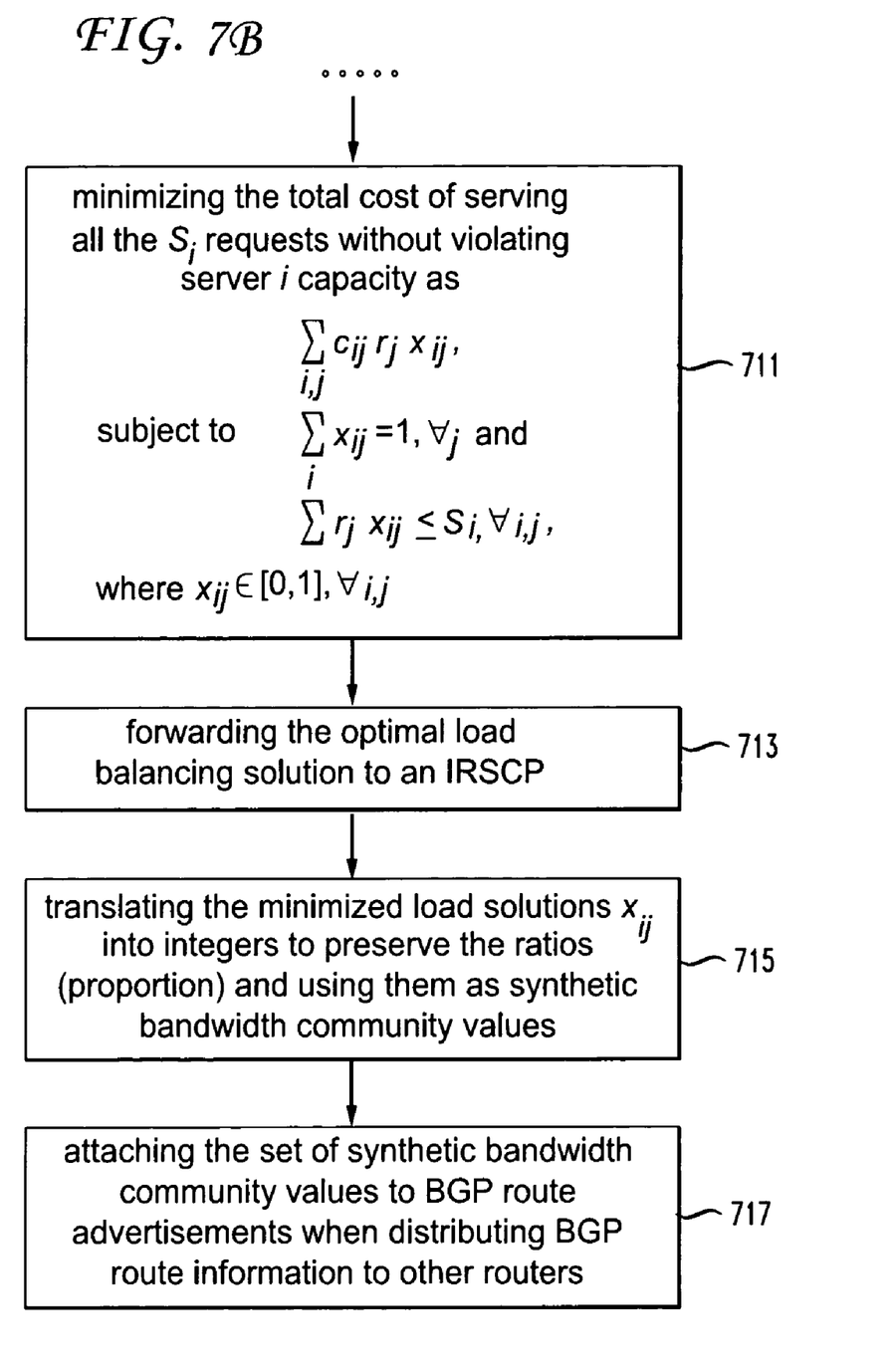

FIG. 6 shows an embodiment of a system 601 framework 603. FIG. 7 shows the multi-path load balancing method according to one embodiment addressing problems in networks such as those shown in FIGS. 1-3.

The framework 603 may be a part of the IRSCP, a part of the NMS server, or standalone, and includes a network interface 605 coupled to an AS and configured to acquire network topology information, network reachability information, as well as network status information to perform network management services. The network interface 605 is coupled to a network manager/inventory database 609, a BGP link bandwidth engine 611 and a processor 613. The processor 613 is coupled to storage 615, memory 617 and I/O 619.

The framework 603 stores acquired network flow data into the data store 615. The framework 603 may be implemented as a computer including a processor 613, memory 617, storage devices 615, software and other components. The processor 613 is coupled to the network interface 605, I/O 619, storage 615 and memory 617 and controls the overall operation of the computer by executing instructions defining the configuration. The instructions may be stored in the storage device 615, for example, a magnetic disk, and loaded into the memory 617 when executing the configuration. The invention may be implemented as an application defined by the computer program instructions stored in the memory 617 and/or storage 615 and controlled by the processor 613 executing the computer program instructions. The computer also includes at least one network interface 605 coupled to and communicating with a network such as shown in FIGS. 1-5 to interrogate and receive network configuration data. The I/O 619 allows for user interaction with the computer via peripheral devices such as a display, a keyboard, a pointing device, and others.

In FIG. 2, the IRSCP acquires current link utilization information which may comprise the amount of traffic currently traversing a link measured as traffic volume in $$\frac{bytes}{second},$$

number of flows per second, or number of transactions per second. Although there are multiple ways of load balancing the traffic at router R5 (e.g., R2:R4=300:150 or 350:100, etc.), embodiments arrive at a solution that splits and sends 270 Mbps to router R2 and 180 Mbps to router R4. Since the ratio is 3:2, bandwidth values of 3 Gbps for the R2-R7 router link and 2 Gbps for the R4-R10 router link realize the solution. The IRSCP distributes the values as part of BGP route information. Then, based on the bandwidth community values, router R5 will send 60% of traffic to router R2 and 40% of traffic to router R4 which implements the optimal load balancing proportion.

In FIG. 3, the IRSCP achieves a similar goal. The difference is the limitation to steer traffic only on a per-router basis, embodiments based on multi-path BGP enables more precise traffic control such that the traffic entering through an ingress router can be distributed to multiple CDN servers. In this scenario, for the IRSCP to have complete traffic control, for each router, a set of equal cost paths for all available CDN servers is set up.

Embodiments perform the following load balancing method. From network flow data (step 701), an IRSCP discovers that each ingress router j sends $r_j$ requests to anycast address G (step 703). Each CDN server i can handle $S_i$ requests without becoming overloaded (step 705). Also, if CDN server i serves a request entered from j, the cost involved is $c_{ij}$ due to latency (step 707). $x_{ij}$ indicates the fraction of requests entering from j that are served at server i (step 709). To minimize the total cost of serving all the $S_i$ requests without violating server capacity, embodiments perform:

$$\text{minimize} \sum_{i,j} c_{ij} r_j x_{ij}, \quad (1)$$

$$\text{subject to} \sum_i x_{ij} = 1, \forall j \text{ and} \quad (2)$$

$$\sum r_j x_{ij} \leq S_i, \forall i, j, \quad (3)$$

where (2) is a constraint that dictates that for each ingress $x_{ij}$, all the requests are served from the collection of servers and (3) is a constraint that maintains all the servers below capacity while serving those requests. With constraints (2) and (3), the total cost is minimized by (1). In the above formulation, $x_{ij}$ may be any real number $$x_{ij} \epsilon [0,1], \forall i,j \quad (4)$$

between 0 and 1 for all i,j per constraint (4) (step 711).

Embodiments rely on a heuristic solution that is suboptimal. By contrast, if $x_{ij}$ is real, then the problem may be solved in polynomial time.

The IRSCP uses the optimal solution as a synthetic bandwidth value to implement load balancing (step 713). The minimized load solution is obtained using standard linear program solver tools. The output of the process produces $x_{ij}$. These values are translated into appropriate integers to preserve the relative ratios and used as synthetic bandwidth community values that realize the optimal load balancing proportion across multiple paths (step 715). The IRSCP attaches the set of bandwidth values to BGP route advertisements when it distributes BGP route information to other routers (step 717). Combining the IRSCP with the system framework 603 enables precise and effective load balancing.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for network multi-path load balancing comprising:
   for an Autonomous System (AS), acquiring IP traffic flow data for each of its ingress routers j;
   for each ingress router j, sending r requests ($r_j$) to an address G in another AS via anycast BGP;
   for each Content Distribution Network (CDN) server i in another AS, S requests ($S_i$) may be processed;
   if CDN server i serves a request entered from router j, a cost c is allocated ($c_{ij}$);
   defining $x_{ij}$ as the fraction of requests entering from router j that are served by server i; and
   minimizing the total cost of serving all the $S_i$ requests without violating server i capacity as $$\sum_{i,j} c_{ij} r_j x_{ij},$$

subject to constraints $$\sum_i x_{ij} = 1, \forall j$$

and $\Sigma r_j x_{ij} \leq S_i, \forall i,j$ as minimized load solutions where $x_{ij}$ where $x_{ij} \epsilon[0,1], \forall i,j$.

2. The method according to claim 1 wherein an AS acquires traffic flow data from Simple Network Management Protocol (SNMP) metrics.

3. The method according to claim 1 wherein an AS acquires traffic flow data from NetFlow network metrics.

4. The method according to claim 1 wherein traffic flow data further comprises the amount of traffic currently traversing a link measured as traffic volume in $$\frac{bytes}{second},$$

number of flows per second, or number of transactions per second.

5. The method according to claim 1 further comprising forwarding the minimized load solutions $x_{ij}$ to an AS Intelligent Route Service Control Point (IRSCP).

6. The method according to claim 5 further comprising:
   translating the minimized load solutions $x_{ij}$ into integers;
   using the integers as synthetic bandwidth community values; and
   attaching the set of synthetic bandwidth community values to BGP route advertisements when distributing BGP route information to other routers.

7. The method according to claim 1 further comprising executing the network multi-path load balancing at an Intelligent Route Service Control Point (IRSCP).

8. The method according to claim 1 further comprising executing the network multi-path load balancing at a Network Management System (NMS) server.

9. A route controller that adjusts route BGP bandwidth extended Community Values (CVs) according to an optimal splitting ratio comprising:
a processor and a storage device having embodied therein a program for execution by the processor, the program providing a multi-path load balancing framework configured to:
for an Autonomous System (AS), acquiring IP traffic flow data for each of its ingress routers j;
for each ingress router j, sending r requests ($r_j$) to an address G in another AS via anycast BGP;
for each Content Distribution Network (CDN) server i in another AS, S requests ($S_i$) may be processed;
if CDN server i serves a request entered from router j, a cost c is allocated ($c_{ij}$);
defining $x_{ij}$ as the fraction of requests entering from router j that are served by server i; and
minimizing the total cost of serving all the $S_i$ requests without violating server i capacity as $$\sum_{i,j} c_{ij} r_j x_{ij},$$

subject to constraints $$\sum_i x_{ij} = 1, \forall j$$

and $\Sigma r_j x_{ij} \leq S_i$, $\forall i,j$ as minimized load solutions $x_{ij}$ where $x_{ij} \in [0,1]$, $\forall i,j$.

10. The route controller according to claim 9 wherein an AS acquires traffic flow data from Simple Network Management Protocol (SNMP) metrics.

11. The route controller according to claim 9 wherein an AS acquires traffic flow data from NetFlow network metrics.

12. The route controller according to claim 9 wherein traffic flow data further comprises the amount of traffic currently traversing a link measured as traffic volume in $$\frac{bytes}{second},$$

number of flows per second, or number of transactions per second.

13. The route controller according to claim 9 further comprising forwarding the minimized load solutions $x_{ij}$ to an AS Intelligent Route Service Control Point (IRSCP).

14. The route controller according to claim 13 further comprising:
translating the minimized load solutions $x_{ij}$ into integers;
using the integers as synthetic bandwidth community values; and
attaching the set of synthetic bandwidth community values to BGP route advertisements when distributing BGP route information to other routers.

15. The route controller according to claim 9 further comprising executing the network multi-path load balancing at an Intelligent Route Service Control Point (IRSCP).

16. The route controller according to claim 9 further comprising executing the network multi-path load balancing at a Network Management System (NMS) server.

* * * * *